United States Patent [19]  
Perigo et al.

[11] Patent Number: 4,499,932  
[45] Date of Patent: Feb. 19, 1985

[54] SEPARABLE COUPLINGS FOR CONTAINERS
[75] Inventors: John A. Perigo, Hailey; John E. Divall, Grove, both of England
[73] Assignee: Metal Box p.l.c., Berkshire, England
[21] Appl. No.: 463,238
[22] Filed: Feb. 2, 1983
[30] Foreign Application Priority Data
  Feb. 2, 1982 [GB] United Kingdom ............... 8202969
[51] Int. Cl.³ .............................................. B65B 3/04
[52] U.S. Cl. ..................................... 141/91; 141/348; 137/614
[58] Field of Search ................................ 141/348–362, 141/285–310, 85–92; 137/614, 237–246.23
[56] References Cited
  U.S. PATENT DOCUMENTS
  1,925,958  9/1933  Giles ........................ 137/614
  1,968,421  7/1934  Proctor ..................... 137/614
  2,260,474 10/1941  Mueller .................... 137/614
  2,629,395  2/1953  Krone et al. ............... 137/614
  3,092,153  6/1963  Stoyke ...................... 137/614
  3,485,371 12/1969  Costantini ................. 137/614

Primary Examiner—Houston S. Bell, Jr.
Attorney, Agent, or Firm—Burns, Doane, Swecker & Mathis

[57] ABSTRACT

A separable coupling for filling or emptying a bulk container of a liquid or semi-liquid food product comprises a closure on the container, and a coupling member attached to a supply or discharge conduit and which is releasably connectable with the closure. Valves on the closure and coupling member are connected in series in the product flow path when the coupling is made. They are connected mechanically together and actuated in series so that the valve of the coupling member is actuated through the agency of the valve on the closure in a fail-safe manner. Provision is made for feeding superheated steam to the part of the product flow path lying between the valves, so that the exposed surfaces of the closure and coupling member can be sterilized or purged before and after a filling or discharging operation.

10 Claims, 4 Drawing Figures

SEPARABLE COUPLINGS FOR CONTAINERS

BACKGROUND OF THE INVENTION

1. Field of the Invention

This invention relates to the filling and/or emptying of containers, particularly (but not exclusively) containers for liquid or semi-liquid food products requiring aseptic conditions of handling and storage.

2. Description of the Prior Art

For the transfer of a liquid or semi-liquid food product to or from a bulk storage container it is known to provide a coupling member which can be coupled to a closure on the container to attach a feed or discharge conduit for the product. These known couplings, however, have been prone to operator error resulting in possible loss of product or internal contamination of the coupling and connected items. Moreover, in applications where asepsis is required it has been necessary, before the coupling is established, to wash or spray with a sterilising fluid those exposed surfaces of the closure and coupling member which are liable to come into contact with the product during filling or discharge. This has been inconvenient and liable to operator error, and moreover has been unreliable to achieve asepsis.

SUMMARY OF THE INVENTION

The present invention seeks to remove or mitigate the above disadvantages and accordingly provides, from one aspect, a separable coupling, which comprises a closure for a container, and a coupling member which is separably connectable with the closure for feeding product to the container or delivering product therefrom, the closure and the coupling member having respective valves which are in series relation in the flow path for product through the coupling, there being a mechanical connection established between the valves when the closure and coupling member are coupled and by means of which the valves are movable together between their open and closed positions, and the closure including means operable from the coupling member for actuating the closure valve and, through the said mechanical connection, the coupling member valve.

According to the invention from a second aspect there is provided a separable coupling, which comprises a closure for a container, and a coupling member which is separably connectable with the closure for supplying product to the container or delivering product therefrom, the closure and the coupling member having respective valves which are in series relation in the flow path for product through the coupling and movable together between their open and closed positions, the coupling including means for supplying a sterilising fluid to the part of the product flow path lying between the valves and at which the coupling is separable.

DETAILED DESCRIPTION OF THE INVENTION

Figure 1:
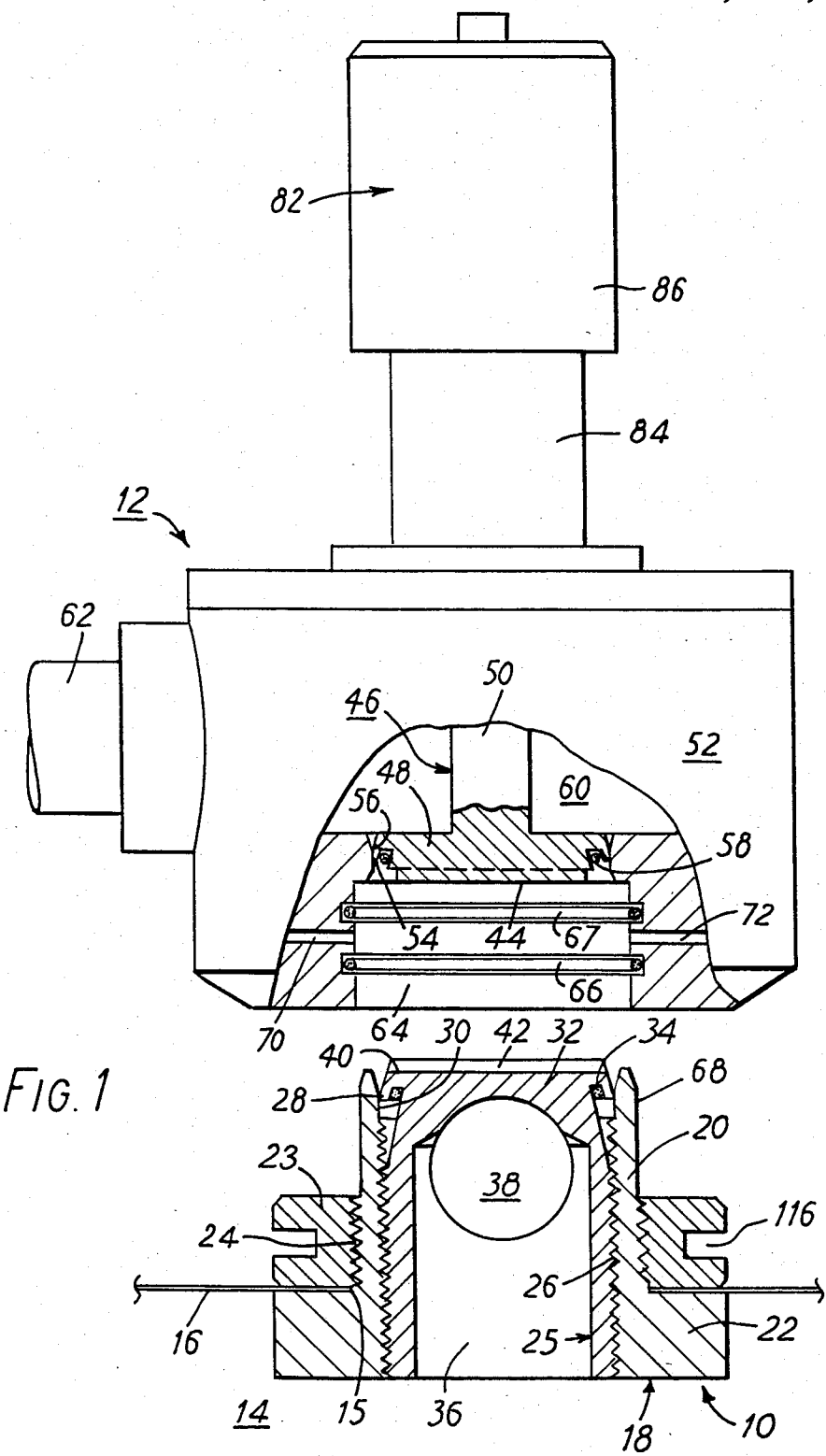
FIG. 1 shows the coupling before engagement of the container closure in a filling head forming the coupling member of the coupling.

Referring now to FIG. 1, a separable coupling through which a container 14 may be filled with product comprises a closure 10 for the container, and a filling head 12 with which the closure is engageable as will later be described.

The closure is shown in position in the container 14, being mounted in an aperture 15 in a wall 16 of the container so as to close the aperture for transit, etc. The container may typically be a bulk container for a liquid or semi-liquid food product (e.g. peach segments in syrup), and formed of a product-containing inner bag fabricated from flexible plastics sheet and forming the wall 16, and an outer enclosure (not shown) of triple fluted board, which provides support and protection for the bag.

In detail, the closure 10 comprises a body 18 having a shank 20 projecting outwardly through the container wall and a locating flange 22 within the container interior, a mounting ring 23 screwed onto the shank 20 at screw threads 24 so as to secure the closure in position on the container by trapping the container wall 16 around the aperture 15 in a fluid-tight manner against the flange 22, and a valve 25 which engages a throughbore in the body 18 at cooperating screw threads 26.

The valve 25 is shown in FIG. 1 in a position in which it is screwed fully into the body 18. In this position it closes the bore in the body against product flow, by engagement of a sealing edge 28 on the valve with a smooth cylindrical surface 30 forming part of the body bore.

The sealing edge 28 is formed on a mushroom-like head 32 of the valve. The valve is of a resilient plastics material such as nylon, and an 'O'-ring 34 located in a groove in the mushroom head 32 is arranged to ensure good sealing engagement of the sealing edge with the surface 30 by exerting a radially outward compressive force on the peripheral margin of the head where the sealing edge is located.

The valve has a blind bore 36 opening into the container interior and closed at its distal end by the mushroom head 32, and a cross bore 38 which extends transversely through the valve so as to communicate the blind bore with the exterior of the valve behind the mushroom head.

The outer face 40 of the mushroom head 32 is diagonally formed with a groove 42 into which a complementary land 44 on a valve 46 of the filling head 12 may engage to couple the mushroom head 32 and valve 46 for rotation together as will later be described in detail. By rotation of the filling head valve 46 in the appropriate sense, the closure valve 25 may be screwed from the closed position shown to an open position in which the cross bore 38 is clear of the free end of the closure body 18 to permit product to enter the container.

The valve 46 of the filling head has a mushroom head 48 formed with the land 44, and a shaft 50 which is mounted for rotational and axial movement in relation to a housing 52. The head 48 is shown in FIG. 1 in its closed position, in which a sealing edge 54 of the head makes sealing engagement with a cylindrical passage-defining surface 56 provided on the housing 52. The engagement of the edge 54 and surface 56 is similar to that previously described for the edge 28 and surface 30 of the closure 10, an 'O'-Ring (denoted 58) being similarly provided to ensure liquid-tightness.

A chamber 60 is formed within the housing 52 behind the mushroom head 48, so as to be closed off by the head in the position shown. A conduit 62 connects the chamber with a bulk storage reservoir (not shown) for the product. In the open position of the valve 46 the head is retracted into the chamber 60 so that product can flow from the chamber and past the head 48 to exit the filling head at a socket 64 formed in the housing 52.

The socket 64 is dimensioned to accept the projecting free end of the shank 20 of the closure 10. It has a pair of axially-spaced sealing rings 66,67 mounted in its wall and arranged individually to make fluid-tight engagement with the cylindrical outer surface 68 presented by the shank 20 beyond the mounting ring 23.

A supply passage 70 for superheated steam extends through the housing so as to enter the socket 64 between the rings 66,67. The steam leaves the filling head by an outlet passage 72 from the socket 64, and a screwed attachment 74 (see FIG. 3) providing a restricting orifice 76 by which the steam is maintained at superatmospheric pressure. A temperature sensor 78 coupled to the attachment 74 is arranged to provide a temperature-dependant electrical output signal on lines 80 and/or a visual display of temperature.

Although not shown, it will be understood that suitable supply 81 and discharge connections for the steam are made to the housing at the supply passage 70 and the attachment 74 respectively. These connections may include a control valve.

The shaft 50, sealed by 'O'-rings 83, extends from the head 48 and through the housing 52 to an actuator 82. The actuator has a cylindrical body 84 mounted on the housing, and an actuating cup 86 which is located over the free end of the body. The free end of the shaft 50 projects through the base of the actuating cup and is connected for rotation with the cup by a pin 92 which extends transversely through the shaft and has its ends located in opposed slots 94 formed in the cup base.

In order to preclude the possibility that microorganisms or other contamination can enter the chamber 60 along the shaft 50, the body 84 of the actuator is arranged to define a cylindrical chamber 96 around the shaft, and inlet and outlet ports 97,98 are provided by means of which the chamber can be continuously purged with steam at superatmospheric pressure supplied and discharged through suitable connections. A compression spring 99 is arranged in chamber 98 to urge the filling head valve 46 downwards into the closed position.

The operation and use of the separable coupling and its component parts, namely the container closure 10 and the filling head 12, are generally as follows.

Containers 14 to be filled with product are received at the filling plant with their closures 10 in position and with their valves 25 closed. To prevent gross contamination during transit, the projecting free ends of the closure shanks 20 have been protected by push-on plastics caps (not shown). These are removed, after which the containers are presented in turn to the filling head 12 so that, as shown in FIG. 1, the socket 64 and the closure shank 20 of the container are axially aligned. At this time the valve 46 of the filling head remains closed from the preceding filling operation, and product is therefore held in the chamber 60 in communication with the bulk storage reservoir via the conduit 62. It will be seen the the hydrostatic pressure of the product acts on the valve 46 in the sense to hold it closed.

It is required to fill the container aseptically with the product, and to that end the surfaces of the closure and filling head which are exposed to atmosphere and which are liable to come into contact with the product are sterilised.

Figure 2:
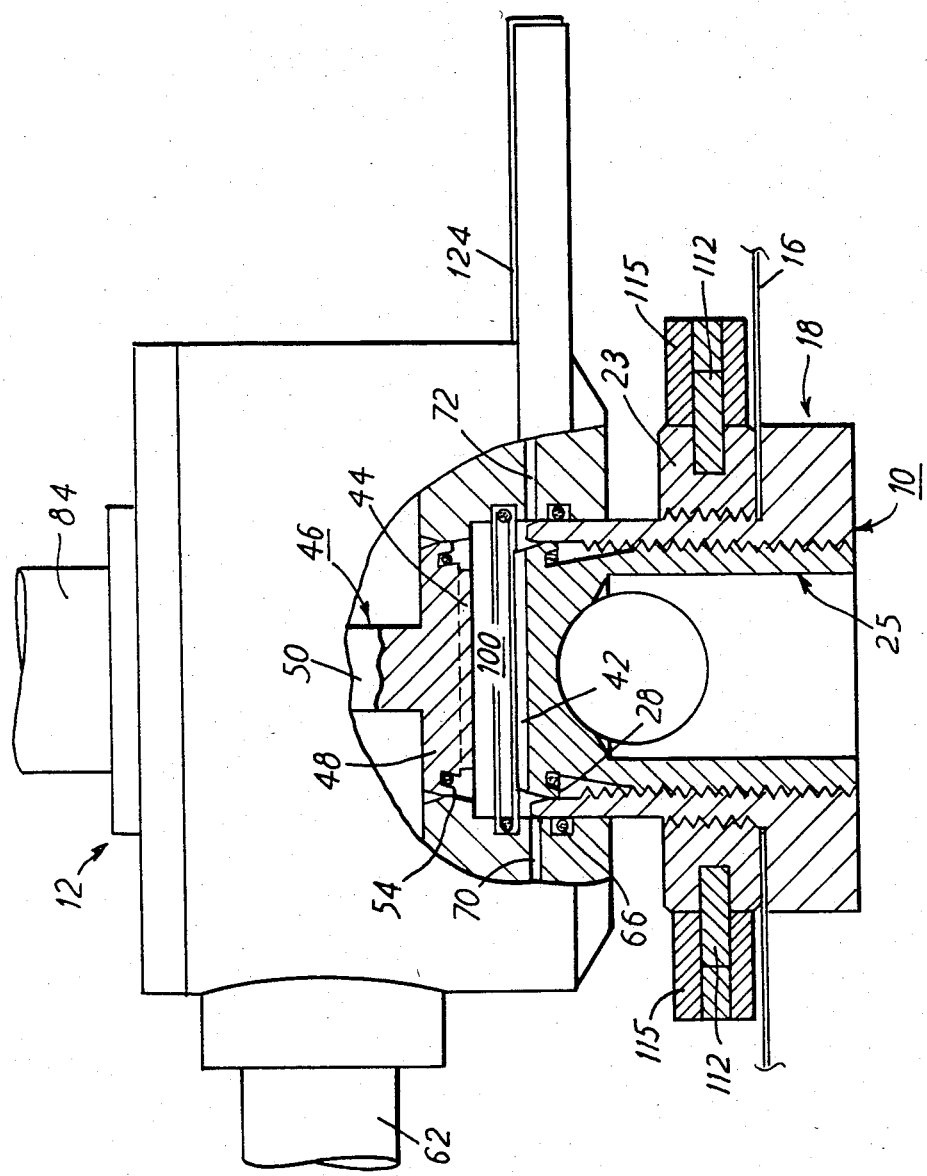
FIG. 2 shows the coupling during sterilisation or purging, with the closure partly engaged in the filling head.

This is achieved by bringing the closure 11 and the filling head 12 together until, as shown in FIG. 2, the shank is partially received in the socket 64 so as to be engaged by the outer sealing ring 66 which accordingly forms a seal. Pressurised steam at above sterilising temperature is then admitted by means of the passage 70 to the empty space 100 (FIG. 2) remaining within the socket between the closed valve heads 32,48, so that the exposed surfaces of the closure and head lying between the sealing edges 28,54 are sterilised.

Figure 3:
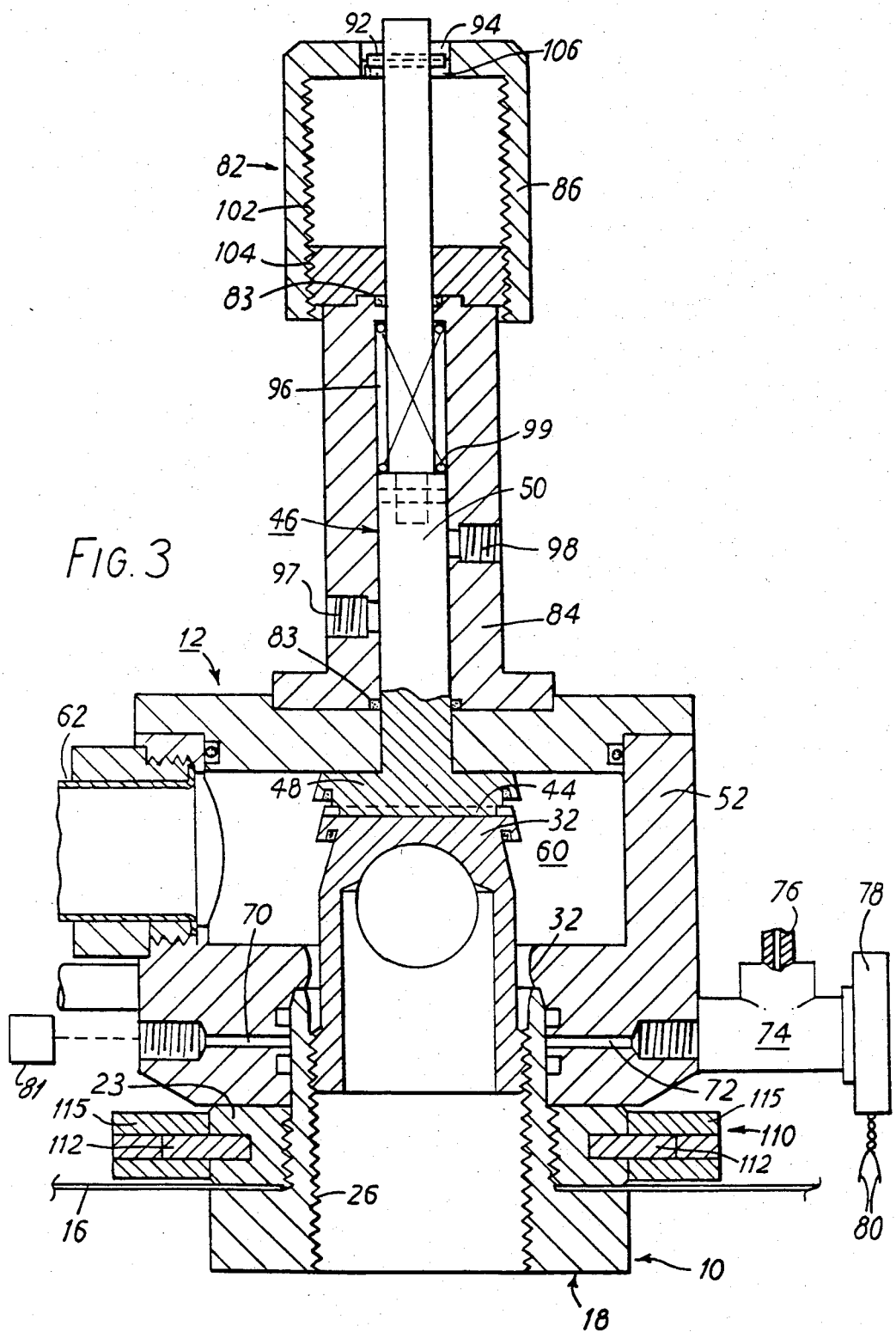
FIG. 3 shows the assembly during product filling, with the closure fully engaged in the filling head.
Figure 4:
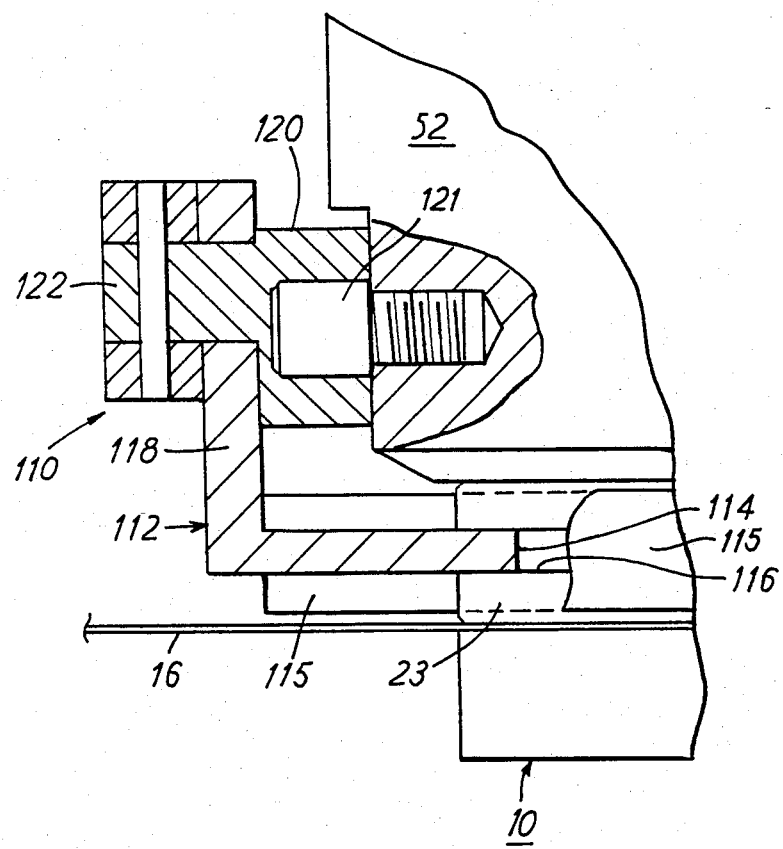
FIG. 4 is a detail view showing a clamping device for the coupling, as seen on a section perpendicular to the views of FIGS. 2 and 3.

After a time sufficient to ensure complete sterilisation, the container and filling head are brought further together to insert the closure shank fully into the socket, e.g. by the clamping device 110 illustrated in FIG. 4, whereupon the actuating cup 86 may be turned by hand to rotate the shaft 50 and thereby, when the land 44 has engaged in the groove 42 as shown in FIG. 3, open both valves as one by screwing the closure valve 25 along the closure body 18. FIG. 3 shows the assembly when the valves are fully open; product can then flow into the container from the bulk storage reservoir.

It is to be particularly noted that the filling head valve 46 is operated through the agency of the closure valve 25, and can therefore only be opened when the filling head is engaged by a closure 10 so that its outlet is sealed as will be explained below. There is therefore little or no danger of product loss from the filling head valve due to operator error. Moreover, the closure valve itself requires the presence of the filling head valve for its operation, and again the possibility of operator error is reduced.

After the required quantity of product has passed to the container, the actuating cup 86 is rotated in the opposite direction to that used for opening, so moving the valve 25 to its closed position and allowing the spring 99 and the hydrostatic head of product in the chamber 60 to close the valve 46 at the same time. The container and filling head are thereafter separated to the partially engaged condition shown in FIG. 2, e.g. by releasing movement of the clamping device 110, thereby admitting steam to the newly formed space 100 to purge the exposed surfaces of the closure 10 and filling head 12 of any residual product. Preferably the pressure of steam to the passage 70 is maintained for substantially the whole duration of the filling operation, that is to say, during the time that the closure shank 20 is partially or wholly received in the socket 64, so as to maintain a sterile barrier. Although the above-desired operation for sterilising the surfaces of the chamber 100 prior to filling may require several minutes, the purging operation may be more quickly effected, and the corresponding partially engaged position of FIG. 2 may be only momentary.

After the purging operation the container and filling head are wholly disengaged, and the container is replaced by an empty container 10 for the succeeding filling operation. The sequence described above is then operated.

In order to reduce the force required from the engagement of the screw threads 26 in the closing and opening of the valves 25,46, and to assist the filling head valve 46 to follow the closure valve 25 during closing, the inside bore of the actuating cup may, as shown in FIG. 3, be screw threaded along its length at 102 for engagement with complementary screw-threads 104 at the free end of the actuator body 84. The threads are such that, as the actuating cup is rotated to open or close the valves 25,46, the cup moves along the actuator in unison with the valve movement, exerting axial force on the shaft by frictional engagement of the pin 92 with the walls of the slots 94. To ensure that the filling head valve 46 cannot be opened other than in tandem with the closure valve 25, an annular rebate 106 within which the pin 92 can rotate is machined in the cup base at the bottom ends of the slots 94. By thus providing a releasable connection between the cup and the shaft it is ensured that the axial position of the shaft is determined only by the axial position of the valve 25 within the closure 10.

An additional feature of the described embodiment is a clamping device 110 (FIG. 4) having two opposed plate members 112, with concave, part-circular free edges 114, which are movable laterally in guides 115 so as to engage in a peripheral groove 116 of the mounting ring 23. At a distance from their free edges 114 the plate members are turned through 90° to form mutually parallel arms 118. Two eccentrics 120 rotatably mounted on horizontal pins 121, one on either side of the filling head housing 52, have off-centre bosses 122 on which the arms 118 are individually journalled and held captive by suitable means. The plate members 112 are engaged in the groove 116 when the filling head is in the position shown in FIG. 2. Handles 124 (FIG. 2) fast with the bosses 122 enable the eccentrics 120 to be manually rotated so as to draw the closure and filling head together by moving to over-centre positions, and clamp them firmly for the filling operation. For clarity the clamping device 110 is omitted from FIG. 1.

Although the separable coupling described above is arranged for manual operation, it will be appreciated that it can readily be adapted for total or partial automation, for example by providing an electric or pneumatic drive for the actuating cup 86, substituting a pneumatic clamping arrangement for the device 110, and providing a suitable automatic sequence control.

Various modifications may be made in the construction illustrated. For example, the closure 10 may be moulded of a plastics material without the external screw threads 24 but with a circumferential groove into which a complementary flange on a mounting member of plastics material can be snap-fitted, thus replacing the mounting ring 23. This mounting member may have upstanding walls surrounding the closure 10 and serving to guide the filling head 12 into position for engagement with the closure. The clamping device 110 may then be replaced by a set of vertical rods with laterally extending feet and means for rotating the rods to swing their feet under a lateral flange on the side of the closure 10 and for lifting the rods to draw the closure and filling head together. The closure valve 25 may be provided with a domed head with projecting pegs which engage in complementary recesses in a correspondingly concave head of the filling head valve 46. The sealing edge 28 may be replaced by a pair of vertically-spaced horizontal sealing lips, in which case the valve 25 will be arrested for purging in the position where the space between the lips is exposed to the sterilising steam supply to ensure that any remnants of product are purged away.

In practice, the coupling is arranged horizontally, rather than vertically as shown, in order that the steam outlet 72,74 shall extend downwards for drainage of any condensate.

In addition, although described above in relation to the aseptic filling of containers 14 from a bulk storage reservoir, the coupling described may also be arranged for emptying the containers in an aseptic manner. The conduit 62 is then arranged to carry the product away from the head 12 rather than supply product to the head. Otherwise, the arrangement and sequence of operations are essentially unchanged.

In contrast to known methods of filling or emptying containers aseptically the described coupling does not require any chemical sterilants or a sterile atmosphere to achieve asepsis. Together with its fail safe nature and adaptability for different products by use of suitable materials, this renders the coupling particularly valuable for small businesses who are thereby able to receive and handle sterile products simply and without the considerable expense of U.H.T. sterilising equipment.

Although of particular application to the aseptic filling or emptying of containers, the invention may also have value to container filling or emptying operations where asepsis is not required.

We claim:
1. In combination, a container and a coupling member removably engageable therewith for conducting a product to or from said container,
said container comprising a container closure having a container passage and a container valve for opening and closing said container passage,
said coupling member comprising a valved passage means and being removably engageable with said container closure when said passage means and said container passage are both closed,
said coupling member including valve actuating means,
said valve actuating means being inoperable to open said valved passage means when said coupling member and said container closure are out of interengagement,
said valve actuating means being operably connectible with said container valve, when said coupling member and said container closure are interengaged, for moving said container valve from a closed position to an open position,
said container valve including means for opening said valved passage means in response to said container valve being opened.

2. A combination according to claim 1, wherein said container valve is arranged to be moved by said actuating means in a first direction, and to be moved in a second, valve-opening direction to open said container passage in response to being moved in said first direction, said container valve being arranged to open said valved passage means in response to being moved in said valve-opening direction.

3. A combination according to claim 2, wherein said container valve is threadedly mounted in said container closure, said actuating means being arranged to rotate said container valve in a rotational path which defines said first direction, said valve-opening direction being defined by axial movement of said container valve occurring in response to rotation thereof.

4. A combination according to claim 1, wherein said valved passage means includes a movable valve element, said valve element forming a part of said actuating means and being operably connected to said container valve when said coupling member is in engagement with said container closure.

5. A combination according to claim 4, wherein said valve element is arranged to be rotated by said actuating means, said container valve being threadedly mounted in said container closure and being arranged to be rotated by said valve element and simultaneously axially moved toward said valve element to open the latter.

6. A combination according to claim 1, wherein said coupling member includes means for conducting sterilizing fluid to said container passage.

7. In combination, a container and a coupling head for conducting a product to or from said container,
said container comprising a container closure having a container passage and a container valve for opening and closing said container passage,
said container valve being threadedly mounted in said container passage so as to be movable in a rotational path as well as in an axial path in response to being moved in said rotational path,
said container valve being arranged to open said container passage upon being moved in a valve-opening axial direction in said axial path and to close said container passage upon being moved in an opposite, valve-closing axial direction,
said coupling head comprising a head passage and a head valve for opening and closing said head passage,
said coupling head being removably engageable with said container closure such that said container passage is communicable with said head passage when said container valve and head valve are both open,
said head valve being mounted in said head for movement independently in rotational and axial paths which substantially coincide with said first-named rotational and axial paths when said head engages said container closure,
said head valve being arranged to open said head passage in response to being moved in said valve-opening axial direction and to close said head passage when moved in said valve-closing axial direction,
said head valve and said closing valve being operably interconnected in simultaneously closed states when said head is engaged with said container closure, such that said head valve is operable to rotate said closure valve in said rotational path, and said closure valve is operable to push said head valve in said valve-opening axial direction,
said head including means for rotating said head valve in said rotational path to impart corresponding rotation to said container valve and thereby produce axial movement of the latter in said valve-opening axial direction when axial movement is imparted to said head valve to open the latter.

8. In combination, a container and a coupling head for conducting a product to or from said container,
said container comprising a container closure having a container passage and a container valve for opening and closing said container passage,
said container valve being disposed in said container passage for movement in a first path as well as in a second path in response to being moved in said first path,
said container valve being arranged to open said container passage upon being moved in a valve-opening direction in said second path and to close said container passage upon being moved in an opposite, valve-closing direction in said second path,
said coupling head comprising a head passage and a head valve for opening and closing said head passage,
said coupling head being removably engageable with said container closure such that said container passage is communicable with said head passage when said container valve and head valve are both open,
said head valve being mounted in said head for movement independently in first and second paths which substantially coincide with said first-named first and second paths when said head engages said container closure,
said head valve being arranged to open said head passage in response to being moved in said valve-opening direction and to close said head passage when moved in said valve-closing direction,
said head valve and said closing valve being operably interconnected in simultaneously closed states when said head is engaged with said container closure, such that said head valve is operable to move said closure valve in said first path, and said closure valve is operable to move said head valve in said valve-opening direction,
said head including means for moving said head valve in said first path to impart corresponding movement to said container valve and thereby produce movement of the latter in said valve-opening direction which is imparted to said head valve to open the latter.

9. In combination, a container and a coupling head removably engageable therewith for conducting a product to or from said container,
said container comprising a container closure having a container passage and a container valve for opening and closing said container passage,
said coupling head comprising:
a head passage,
a head valve for opening and closing said head passage,
a socket communicating with said passage and opening toward said container closure for receiving the latter when said coupling head engages said container with the container valve and said head valve being both closed, and
supply conduit means communicating with said socket for introducing a sterilizing fluid into said socket when said container closure is received in said socket,
a source of sterilizing fluid connected to said supply conduit means, and
seal means creating a fluid seal between said container closure and said socket when the former is received in the latter.

10. A combination according to claim 9 including discharge conduit means communicating with said socket for conducting sterilizing fluid out of said socket, said seal means including a first seal situated to one side of said supply and discharge conduit means and a second seal situated to the other side of said supply and discharge conduit means.

* * * * *